(12) United States Patent
Wass (10) Patent No.: US 12,455,187 B2
(45) Date of Patent: Oct. 28, 2025

(54) SAMPLE RELATED SYSTEM THAT INCLUDES A LOAD LOCK

(71) Applicant: Applied Materials Israel Ltd., Rehovot (IL)

(72) Inventor: Oren Wass, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 405 days.

(21) Appl. No.: 18/121,533

(22) Filed: Mar. 14, 2023

(65) Prior Publication Data

US 2024/0310205 A1    Sep. 19, 2024

(51) Int. Cl.
*G01G 21/28*    (2006.01)
*G01G 13/26*    (2006.01)

(52) U.S. Cl.
CPC ............. *G01G 21/28* (2013.01); *G01G 13/26* (2013.01)

(58) Field of Classification Search
CPC ............................ G01G 21/28; G01G 13/26
USPC .......................................................... 177/264
See application file for complete search history.

(56) References Cited

U.S. PATENT DOCUMENTS

| | | | |
|---|---|---|---|
| 8,070,408 B2 * | 12/2011 | Behdjat | H01L 21/67201 414/217 |
| 8,440,048 B2 * | 5/2013 | Aggarwal | C30B 25/16 156/345.31 |
| 11,474,009 B2 * | 10/2022 | Regnat | B01L 7/50 |
| 2012/0170999 A1 * | 7/2012 | Sakaue | H01L 21/67739 414/217 |
| 2013/0017317 A1 * | 1/2013 | Ring | C23C 16/52 118/712 |
| 2014/0027968 A1 | 1/2014 | Krayvitz (Krivts) et al. | |

* cited by examiner

*Primary Examiner* — Jacques M Saint Surin
(74) *Attorney, Agent, or Firm* — Kilpatrick Townsend & Stockton LLP (57) ABSTRACT

A sample related system that includes a vacuum chamber, a load lock chamber that includes a first port that is interfaces with a first environment having a first pressure; a second port that interfaces with a second environment that comprises the vacuum chamber; a load lock chamber pressure control unit that is configured to control a pressure within the load lock chamber; and a mass measurement unit that is configured measure a mass of the sample, during at least one point in time, wherein during each point of time of the at least one point in time the load lock chamber is at a load lock chamber vacuum level. The load lock chamber is mechanically isolated from an environment of the sample related system. The vacuumed chamber is for performing a sample related operations elected out of sample evaluation or sample processing.

17 Claims, 12 Drawing Sheets

SAMPLE RELATED SYSTEM THAT INCLUDES A LOAD LOCK

BACKGROUND OF THE INVENTION

A highly accurate mass measurement of a sample is very costly as it has to take into account various environmental parameters such as air pressure, humidity, mechanical vibrations, and the like.

A dedicated and costly mass measurement system can be used to measure the mass of a sample. The mass measurement system has to take into account the various environmental parameters, for example, by accurately measuring these various environmental parameters and compensating for them.

There is a growing need to reduce the cost of the mass measurement of the sample.

BRIEF SUMMARY OF THE INVENTION

There may be provided a cost effective and highly accurate mass measurement.

There may be provided a sample related system, that may include a vacuum chamber and a load lock chamber that may include (i) a first port that is interfaces with a first environment having a first pressure; (ii) a second port that interfaces with a second environment that comprises the vacuum chamber; (iii) a load lock chamber pressure control unit that is configured to control a pressure within the load lock chamber; and (iv) a mass measurement unit that is configured measure a mass of the sample, during at least one point in time, wherein during each point of time of the at least one point in time the load lock chamber is at a load lock chamber vacuum level. The load lock chamber is mechanically isolated from an environment of the sample related system. The vacuumed chamber is for performing a sample related operations elected out of sample evaluation or sample processing. It should be noted that the first port may differ from the second port, or that the first port may be the second port. Any reference to a multiple-port local lock chamber may be applicable, mutatis mutandis to a single port load lock chamber.

There may be provided method for mass measurement of a sample, the method may include receiving the sample from a first environment having a first pressure and by a first port of a load lock chamber; wherein the load lock chamber is mechanically isolated from an environment of the sample related system; measuring, by a mass measurement unit positioned within the load lock chamber, a mass of the sample, during at least one point in time to provide at least one measurement result; and controlling, by a load lock chamber pressure control unit of the load lock chamber, a pressure within the load lock chamber so that during each point of time of the at least one point in time the load lock chamber is at a load lock chamber vacuum level. Any reference to a multiple-port local lock chamber may be applicable, mutatis mutandis to a single port load lock chamber.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

There may be provided a system and a method for measuring a mass of a sample. The mass measurement may be highly accurate and may have an accuracy that is finer that one microgram and even less.

The high accuracy is contributed, at least in part, by performing the mass measurement within a controlled environment of a load lock chamber. The load lock chamber is a part of a sample related system that include at least one vacuum chamber. By performing the mass measurement unit within the load lock chamber, the mass measurement unit benefits from the isolation of the load lock chamber from the environment outside the sample related system. The isolation may include a mechanical isolation. The positioning of the mass measurement unit within the load lock chamber also dramatically reduces electromagnetic interference (EMI) (and may even provide EMI isolation). The ability of the load lock chamber to control the pressure conditions within the load lock chamber also provides pressure isolation from the environment outside the sample related system. Maintaining vacuum within the load lock chamber reduces the buoyancy effect on the sample. The temperature of the load lock chamber may also be controlled and maintained at desired values, which further contributed to the repeatability of the mass measurements.

Having an existing mechanically and electromagnetically isolated environment along with thermal control and atmospheric isolation capability (via vacuum) will enable using a simpler and less costly mass measurement unit.

The sample related system may be a sample evaluation system such as an inspection system, a metrology system, a review system, a critical dimension measurement system, and the like.

The sample related system may be a sample processing system such as a lithographic system, an etching system, a deposition system, and the like.

The sample related system may be a combination of a sample processing system and a sample evaluation system. Such a combined tool may include one or more sample evaluation chambers and one or more sample processing chambers. An example of such a sample related system that is the cluster tool illustrated in US patent application publication serial number 2014/0027968 of Krayvits et el. Which is incorporated herein by reference. The cluster tool has various mechanical isolation elements such as a chassis, a vibration isolation system that is supported by the chassis.

Examples of vibration isolation systems include the SEMBASE® of TMC Inc. of Peabody, Massachusetts, VAIS-PB active vibration isolation base platforms for SEM-FIB-TEM of COXEM Co. Ltd. of Yuseong-gu, Daejeon, South Korea, and the like.

Figure 1:
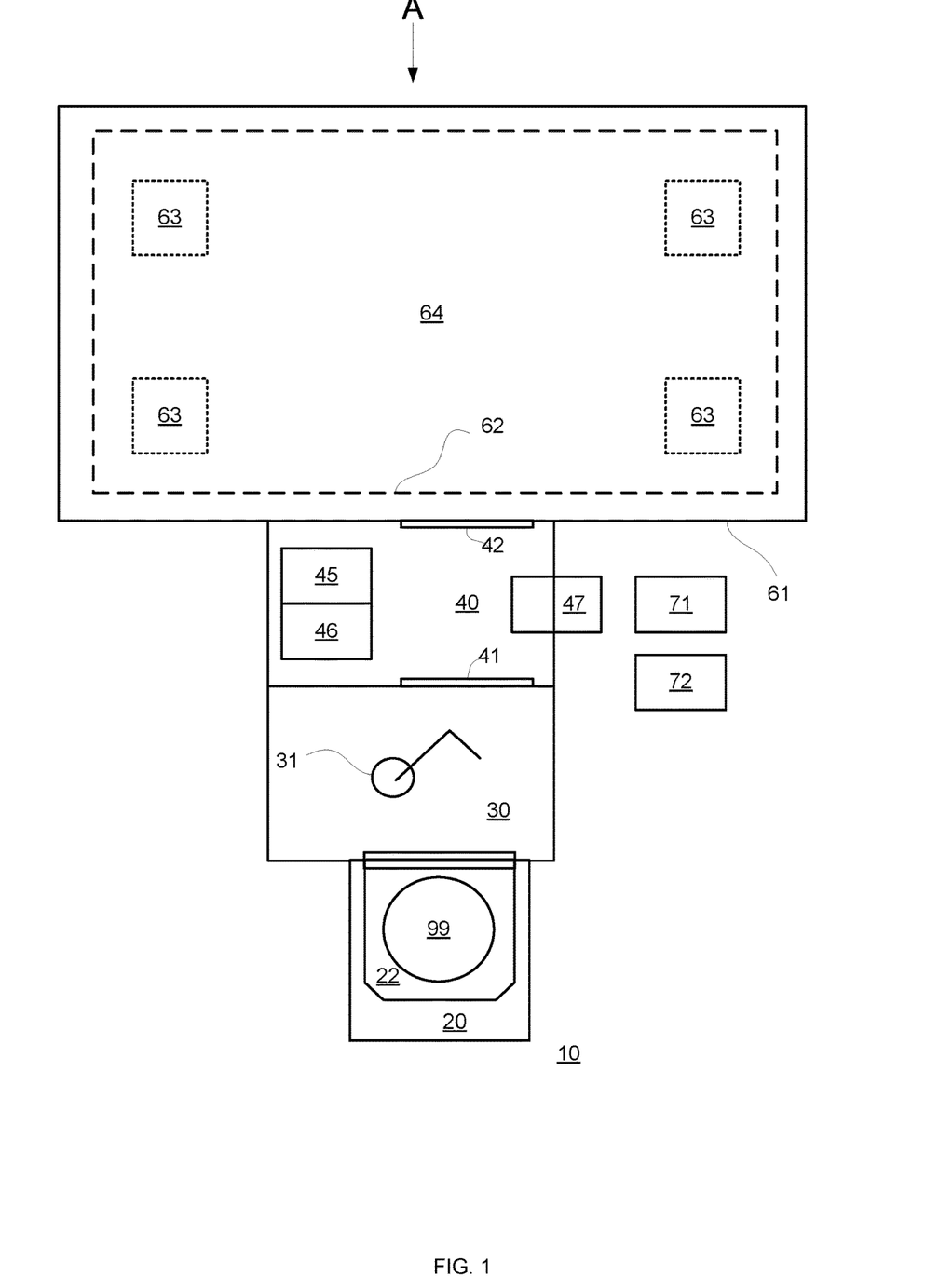
FIG. 1 is an example of a sample related system.

FIG. 1 illustrates an example of a sample related system 10. The sample related system 10 includes a sample interface 20 that may hold a cassette 22 that stores one or more samples such as sample 99. The sample interface 20 is followed by a transfer unit 30 that include a robot 31 for transferring the sample between the sample interface and load lock chamber 40. The sample related system, 10 also includes vacuum chamber 60 that is supported by a various mechanical elements such as chassis 64.

One or more vibration isolation system 63 are supported by the chassis 64. Various sample processing elements and, additionally or alternatively, sample evaluation elements (for example an ion gun, an electron gun) may also be included, and at least some of the elements may be at least partially located within the vacuum chamber.

The local lock chamber 40 may include (i) first port 41 that is interfaces with a first environment having a first pressure, (ii) second port 42 that interfaces with a second environment that includes vacuum chamber 61, (iii) load lock chamber pressure control unit 47 that is configured to control a pressure within the load lock chamber, (iv) mass measurement unit that is configured measure a mass of the sample, during at least one point in time, wherein during each point of time of the at least one point in time the load lock chamber is at a load lock chamber vacuum level, and (v) additional elements 46 such as a pre-aligner, temperature control unit (for example at least one heating element), and the like.

FIG. 1 illustrates that the sample related system 10 may also include a processor 71 and a controller 72.

The mass measurement unit 45 may be configured to measure the mass of the sample during multiple points in time to provide multiple measurement results.

In one example—the sample may be maintained within the load lock chamber between an earliest point of time of the multiple points in time and a latest point of time of the multiple points of time.

The processor 71 is configured to determine a state of the sample based on the multiple measurement results. The state of the sample may include whether the sample is outgassing, a step in an outgassing process of the sample, and the like.

For example—when mass of the sample is measured multiple times, a reduction of mass of the sample between measurements may be indicative of an outgassing, and even of a current phase within an outgassing process.

The processor 71 may be configured to determine a timing of sending the sample through the second port to the vacuum chamber based on the state of the sample. For example, assuming that the sample is at a certain stage of outgassing in which the outgassing exceeds an outgassing threshold over which the sample should not enter the vacuum chamber. In this case the processor will estimate when the outgassing will be below the outgassing rate threshold—and only then (after a delay) will provide the sample to the vacuum chamber. The processor may also determine to reject a sample that exhibits an outgassing that exceeds the outgassing threshold.

In another example, the sample may be positioned outside the load lock chamber during an out-of-load-lock-chamber period. The out-of-load-lock-chamber period may span between one point in time and another point in time of the multiple points in time.

During the out-of-load-lock-chamber period the sample may be processed by applying a sample processing operation (such as etching, deposition, milling, and the like).

The mass measurement unit may perform one or more measurement before the out-of-load-lock-chamber period and may perform one or more measurements after the out-of-load-lock-chamber period.

The measurement results conducted before the out-of-load-lock-chamber period are indicative of a state of the sample before the out-of-load-lock-chamber period. The measurement results conducted after the out-of-load-lock-chamber period are indicative of the state of the sample after the out-of-load-lock-chamber period.

A change in the state of the sample during the out-of-load-lock-chamber period may be evaluated by comparing the mass of the sample after the out-of-load-lock-chamber period to the mass of the sample before the out-of-load-lock-chamber period.

If, for example, the sample processing operation (applied during the out-of-load-lock-chamber period) introduces a mass change that deviates from an expected mass change—then the sample processing operation may be flagged as potentially faulty.

The processor 71 may also be configured to obtain sample evaluation results from after the out-of-load-lock-chamber period (or after a sample processing operation applied during the out-of-load-lock-chamber period), and use the sample evaluation results (for example defect detection results, sample review results, or sample measurement results) and the measurements results indicative to the mass difference of the sample during the out-of-load-lock-chamber period—and determine potential problems in the implementation of the sample processing operation.

Figure 2:
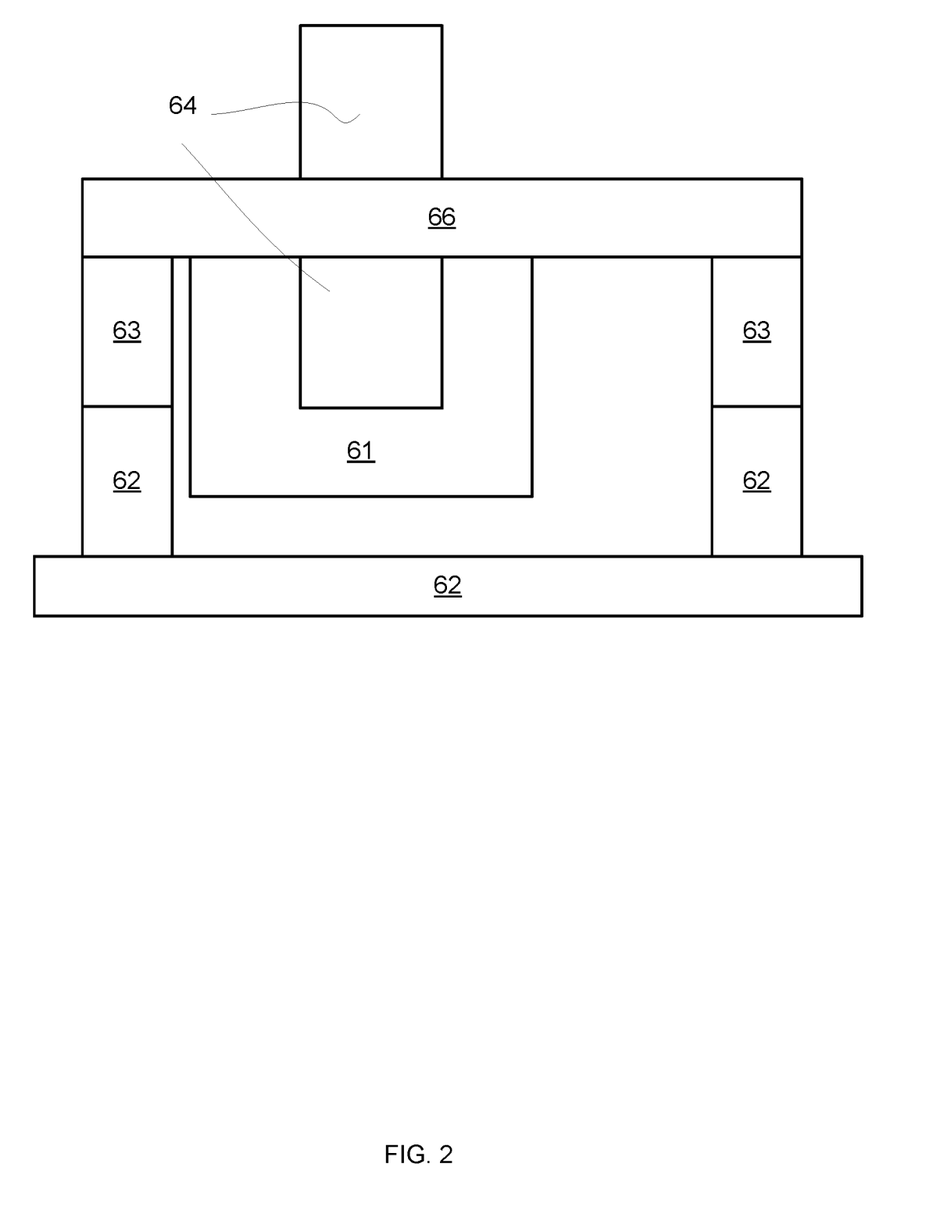
FIG. 2 is an example of a sample related system.

FIG. 2 is a back view of the sample related system. The back view is taken from point A of FIG. 1.

For simplicity of explanation it is assumed that the vacuum chamber 61 belongs to a scanning electron microscope and that electron optics 64 are partially located within the vacuum chamber and are partially located outside the vacuum chamber 61.

FIG. 2 illustrates an example of one or more vibration isolation system 63 that are supported by the chassis 64. In FIG. 2 the vibration isolation systems 63 are positioned between legs of the chassis 62 and a bulk 66.

Figure 3:
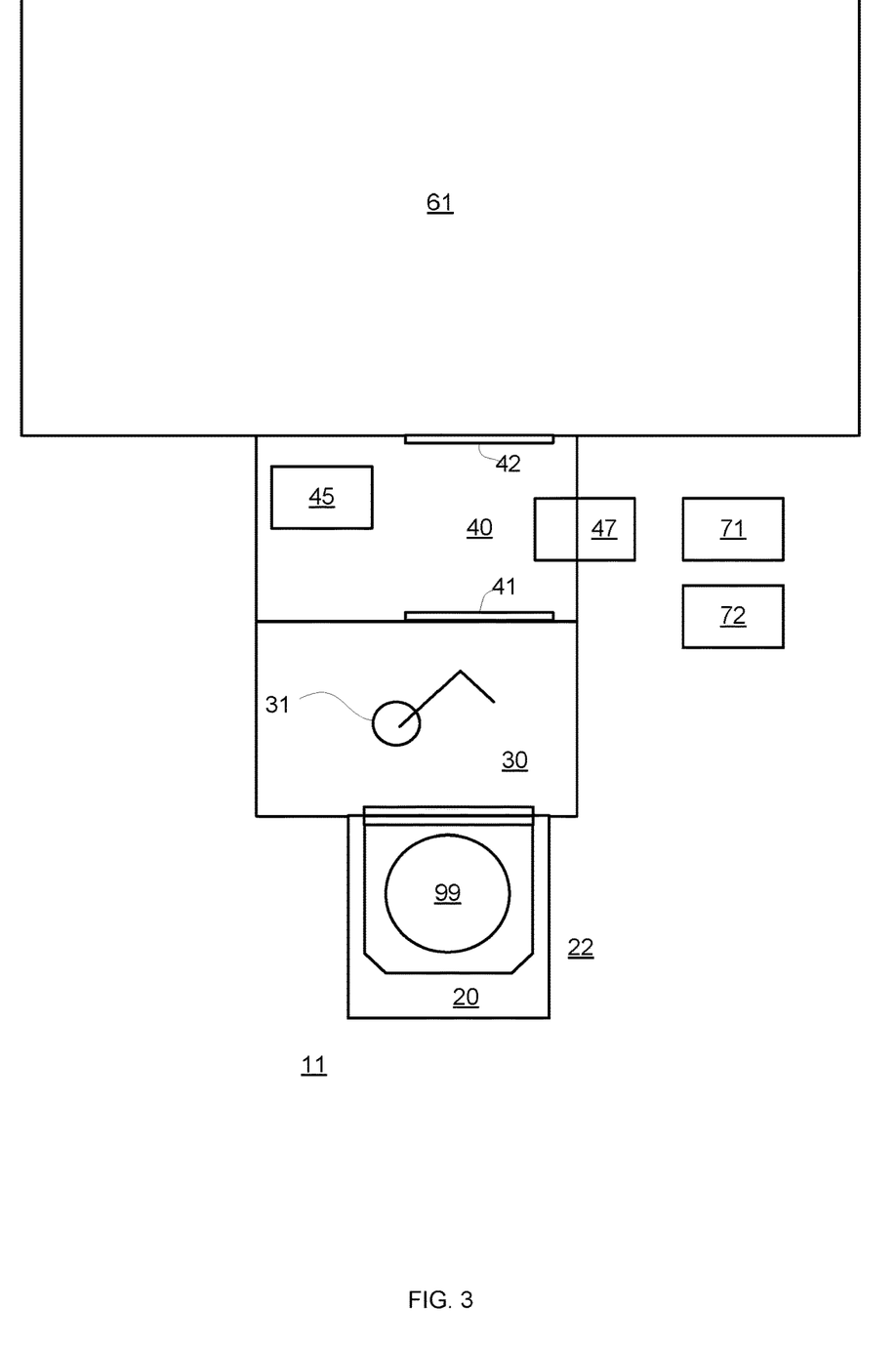
FIG. 3 is an example of a sample related system.

FIG. 3 illustrates an example of a sample related system 12. The sample related system 12 of FIG. 3 differs from the sample related system 10 of FIG. 1 by not having the additional elements (denoted 46 in FIG. 1) within the load lock chamber 40.

Figure 4:
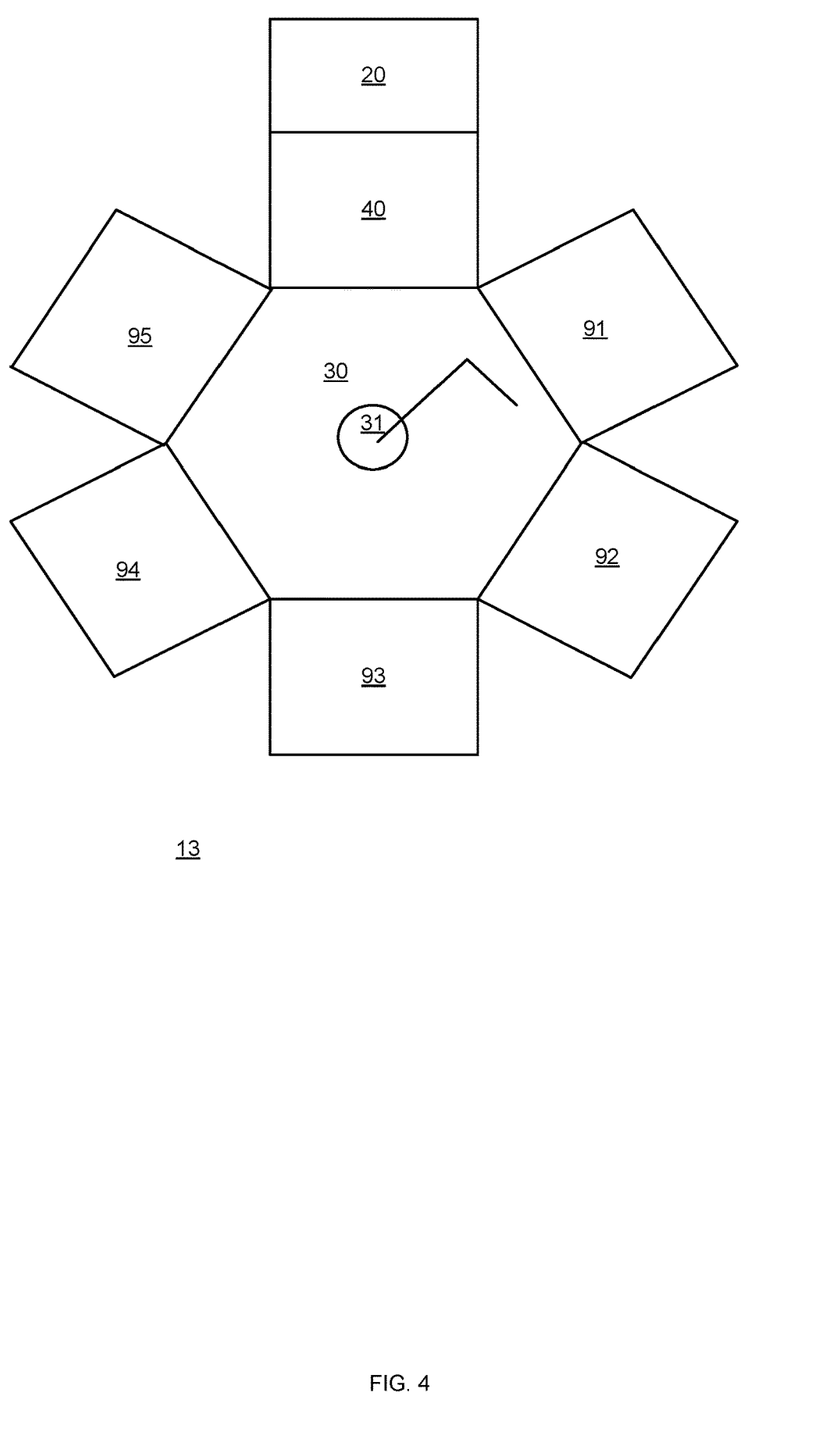
FIG. 4 is an example of a sample related system.

FIG. 4 illustrates an example of a sample related system 13 that is a cluster tool that includes sample interface 20 followed by load lock chamber 40, multiple chambers (first chamber 91, second chamber 92, third chamber 93, fourth chamber 94 and fifth chamber 95), and a transfer unit 30 that includes a robot for transferring the sample between any one of the multiple chambers and the load lock chamber 40. The multiple chamber may include sample processing chambers, sample evaluation chambers or a combination of both types of chambers.

Figure 5:
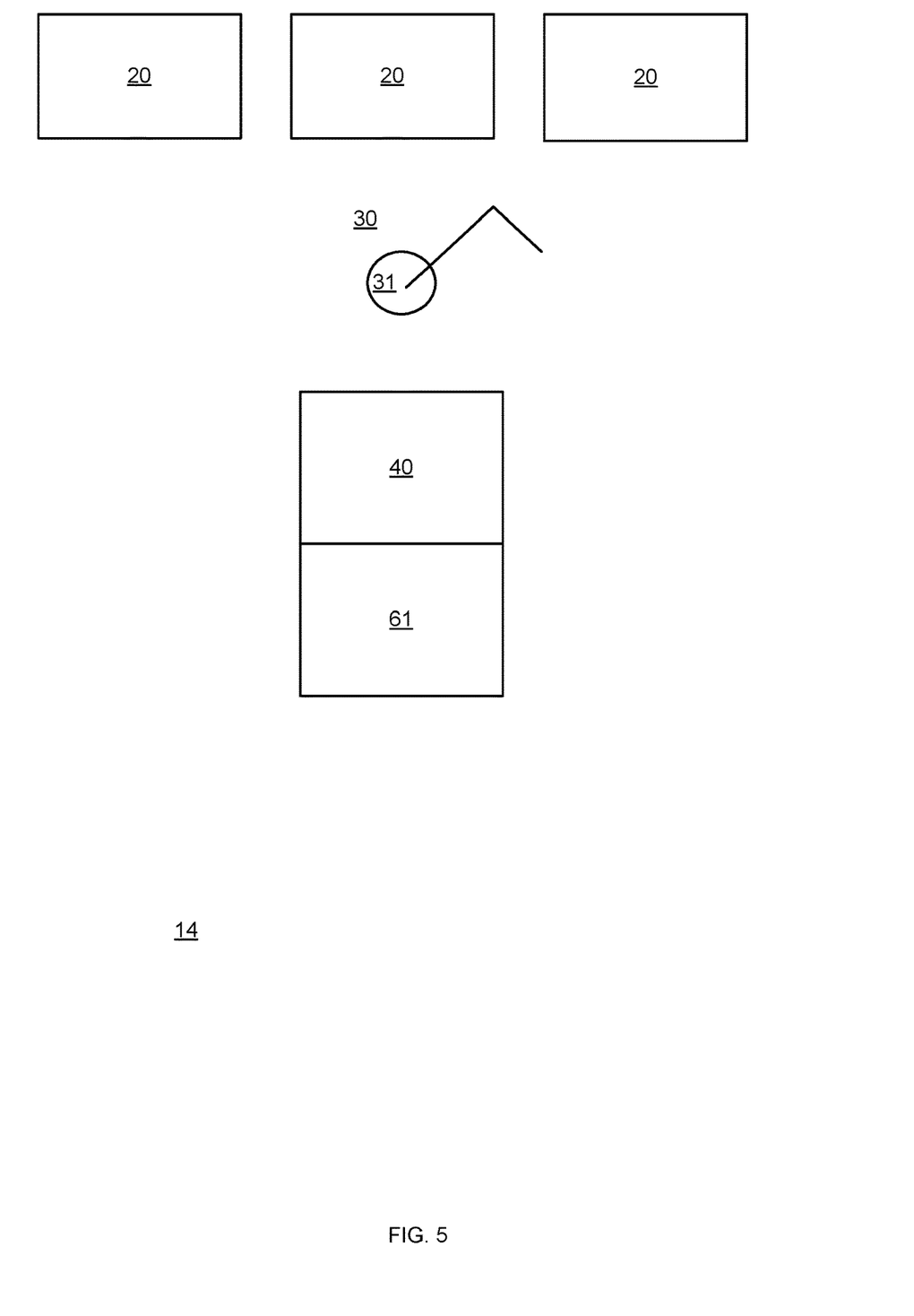
FIG. 5 is an example of a sample related system.

FIG. 5 illustrates an example of a sample related system 14 that includes multiple sample interfaces 20, a transfer unit 30 that includes a robot 31, load lock chamber 40 and vacuum chamber 61.

Figure 6:
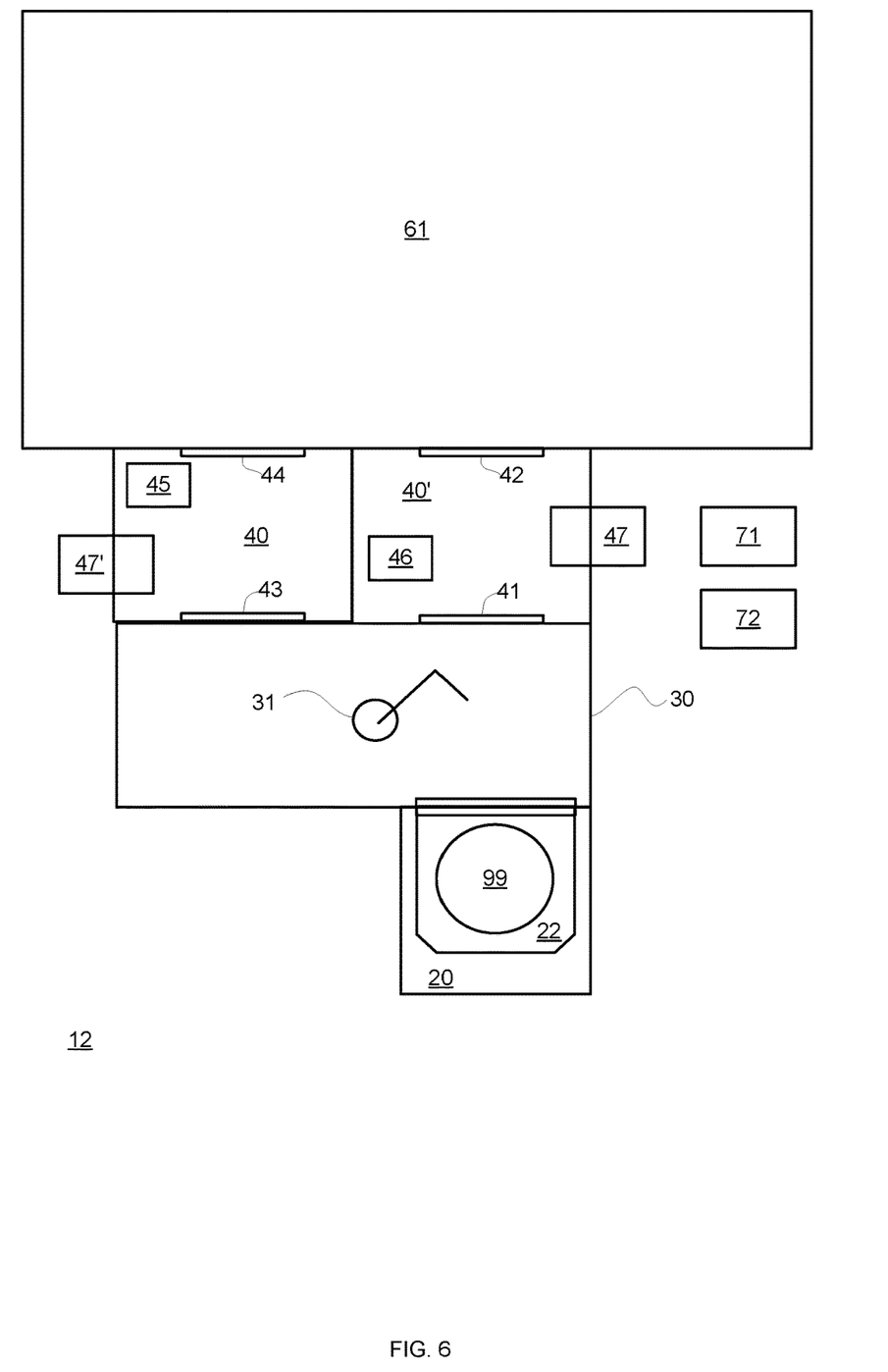
FIG. 6 is an example of a sample related system.

FIG. 6 illustrates an example of a sample related system 13. The sample related system 13 of FIG. 6 differs from the sample related system 10 of FIG. 1 by including an other load lock chamber 40' that includes (i) third port 43 that is interfaces with the first environment having the first pressure, (ii) fourth port 44 that interfaces with a second environment that includes vacuum chamber 61, (iii) load lock chamber pressure control unit 47 that is configured to control a pressure within the load lock chamber, and (iv) additional elements 46.

In the sample related system 12, each sample may be sent by the transfer system to the load lock chamber 40 and to be measured by the mass measurement unit 45 before being sent to the vacuum chamber 61.

In some cases, mass measurements may be conducted to determine whether the state of the sample is compliant with the state required to enter the sample to the vacuum chamber 61—for example for preventing the formation of electrical arcs within the vacuum chamber 61. The sample may be maintained within the load lock chamber until reaching a desired state and then sent to the vacuum chamber via second port 42 or be sent (using the transfer system 30) to the other load lock chamber 40' before being provided to the vacuum chamber 61. For example—the sample should be pre-aligned before being provided to the vacuum chamber—and the other load lock chamber has a pre-aligner (that may belong to the additional elements 46 of the other load lock chamber).

In other cases, the sample may be provided to the load lock chamber to have its mass measured and then sent to the vacuum chamber or back to the transfer system 30 to the sample interface 20 or to another sample interface (not shown).

It should be noted that some samples may be sent to the vacuum chamber through the load lock chamber 40 and some other samples may be sent to the vacuum chamber through the other load lock chamber 40', and without entering the load lock chamber 40.

The processor 71 may be configured to select a receiving load lock chamber out of the load lock chamber and the other load lock chamber. The transfer unit is configured to transfer the sample from the first environment to the receiving load lock chamber.

The selection may be based on the state of the sample, for example, whether the sample is outgassing or is suspected to be outgassing.

Figure 7:
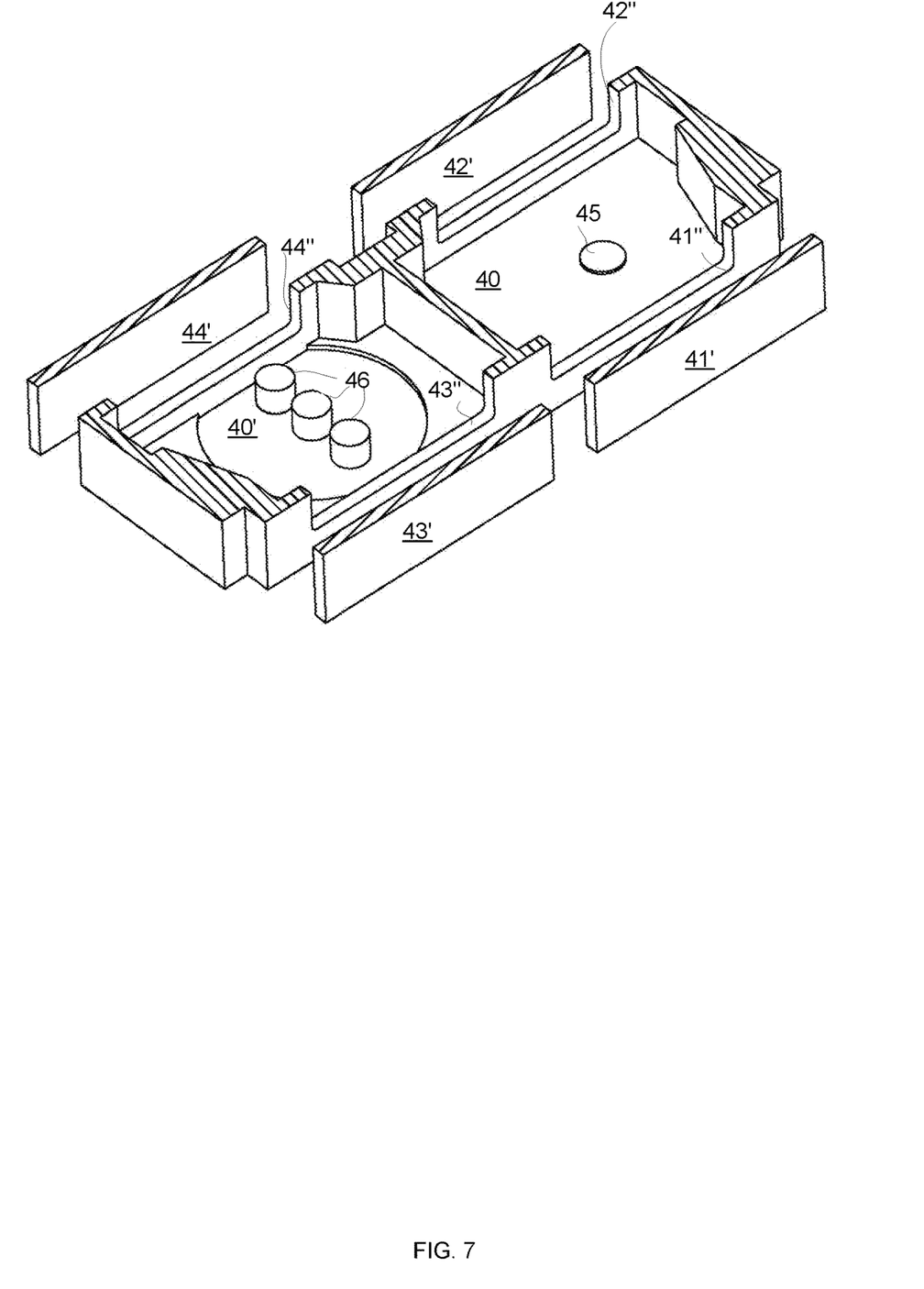
FIG. 7 is an example of a part of a load lock chamber and a part of an other load lock chamber.
Figure 8:
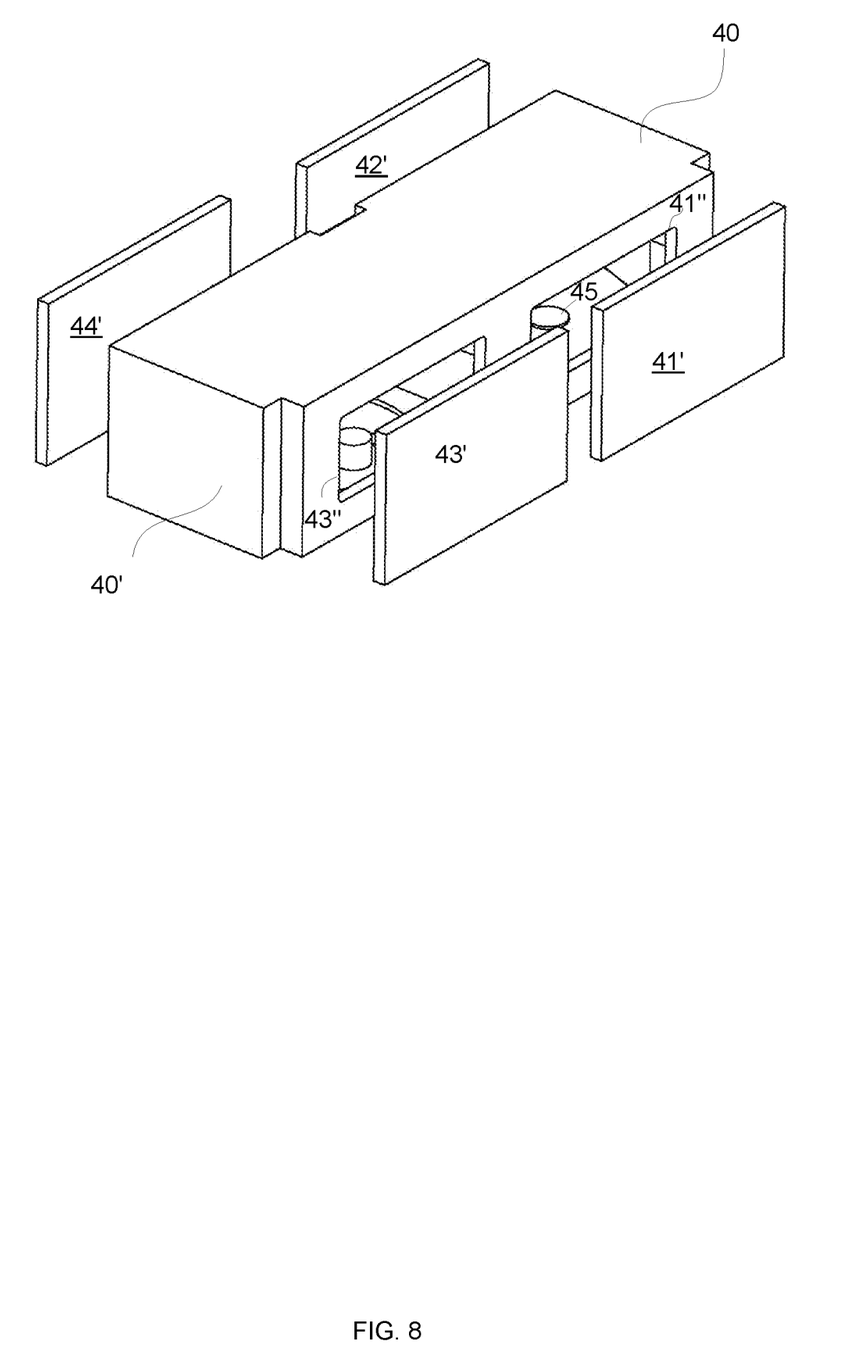
FIG. 8 is an example of a part of a load lock chamber and a part of an other load lock chamber.

FIG. 7 and FIG. 8 illustrate an example of a part of the load lock chamber 40 and a part of the other load lock chamber 40'.

The part of the load lock chamber 40 includes mass measurement unit 45, first port (that includes first port opening 41" and first port sealing element 41' for sealing the first port opening 41"), and second port (that includes second port opening 42" and second port sealing element 42' for sealing the second port opening 41").

The part of the other load lock chamber 40' includes additional elements 46, third port (that includes third port opening 43" and third port sealing element 43' for sealing the third port opening 43"), and fourth port (that includes fourth port opening 44" and fourth port sealing element 44' for sealing the fourth port opening 43").

Figure 9:
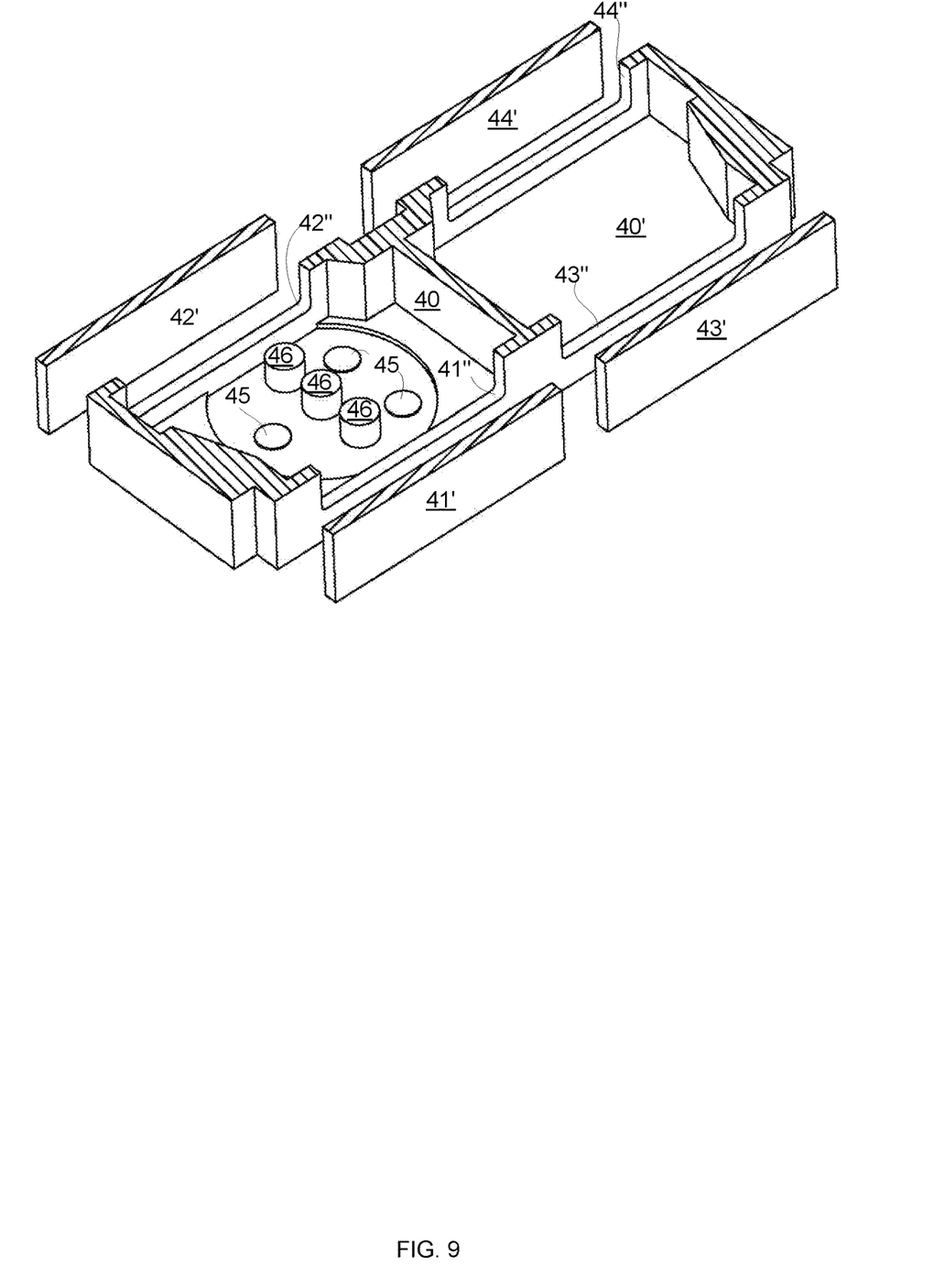
FIG. 9 is an example of a part of a load lock chamber and a part of an other load lock chamber.

FIG. 9 illustrates an example of a part of the load lock chamber 40 and a part of the other load lock chamber 40'.

The part of the load lock chamber 40 includes mass measurement unit 45, additional elements 46, first port (that includes first port opening 41" and first port sealing element 41' for sealing the first port opening 41"), and second port (that includes second port opening 42" and second port sealing element 42' for sealing the second port opening 41").

The part of the other load lock chamber 40' includes third port (that includes third port opening 43" and third port sealing element 43' for sealing the third port opening 43"), and fourth port (that includes fourth port opening 44" and fourth port sealing element 44' for sealing the fourth port opening 43").

Figure 10:
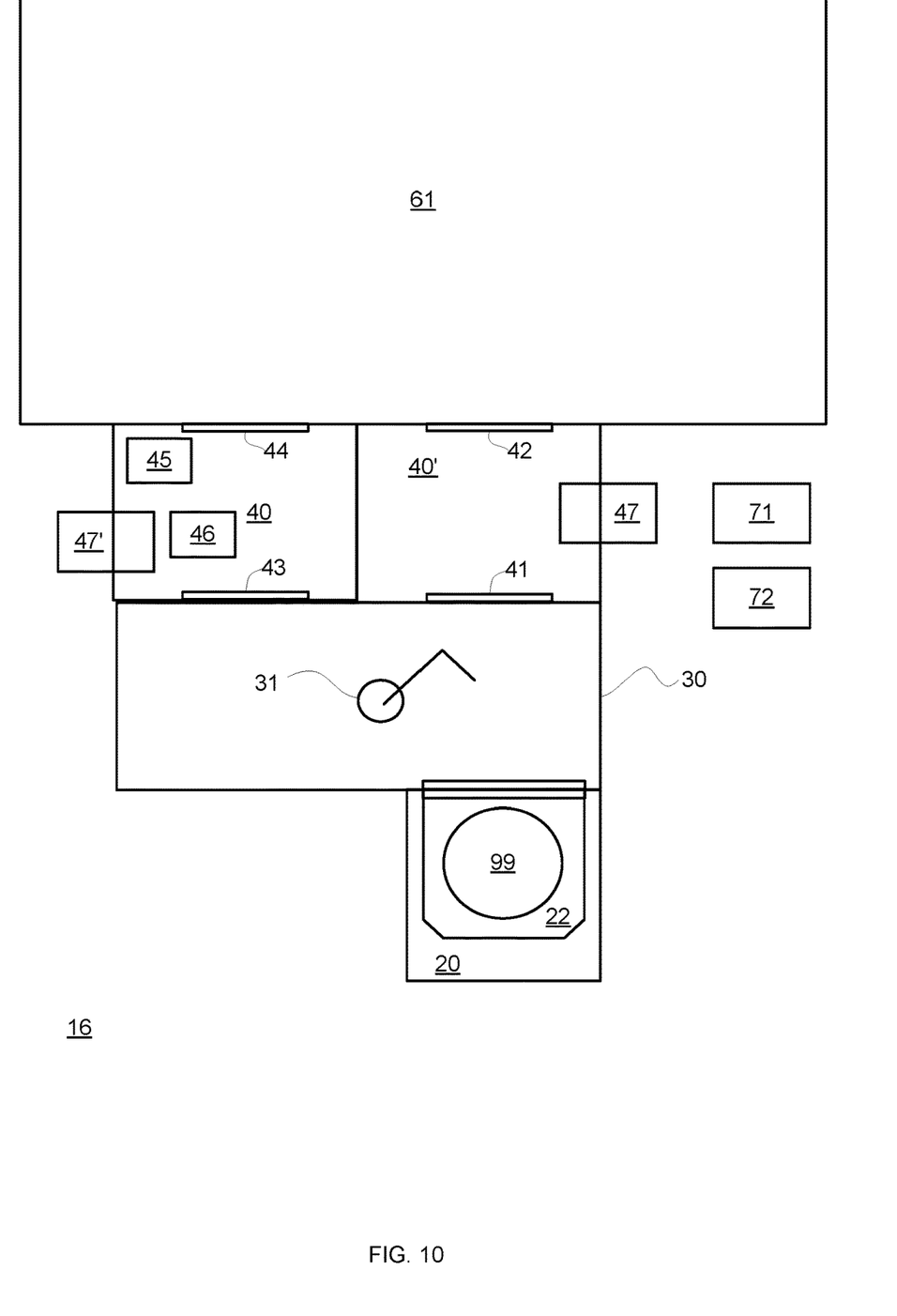
FIG. 10 is an example of a sample related system.

FIG. 10 illustrates an example of a sample related system 16. The sample related system 16 of FIG. 9 differs from the sample related system 13 of FIG. 6 by having the additional elements 46 in the load lock chamber instead in the other load lock chamber.

Figure 11:
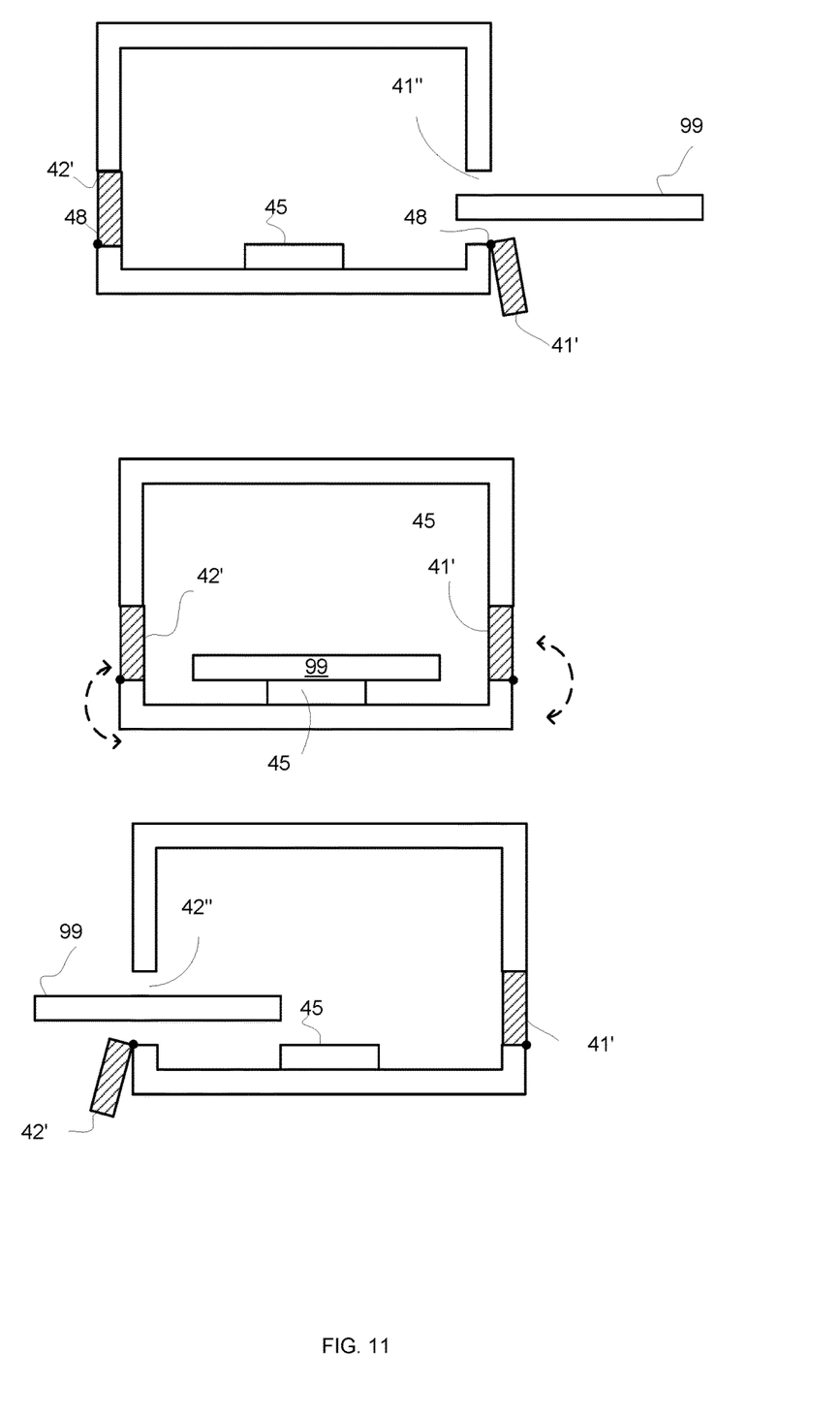
FIG. 11 is an example of a part of a load lock chamber.

FIG. 11 illustrates sample 99 and the load lock chamber 45 during various times.

The top of FIG. 11 illustrates sample 99 as passing through the first port opening 41", while the first port opening 41" is open, the first port sealing element 41' is located at an OPEN position that does not seal the first port sealing element 41. The second port opening is sealed by second port sealing element 42' that is positioned in a SEAL position.

The middle of FIG. 11 illustrates the sample 99 while the mass of the sample is being measured by mass measurement unit 45 and while a load lock chamber vacuum is maintained within the load lock chamber 40. The first port sealing element 41' and the second port sealing element 42' are positioned in a SEAL position.

The bottom of FIG. 11 illustrates the sample 99 as passing through the second port opening 42", while the second port opening 42" is open, the second port sealing element 42' is located at an OPEN position that does not seal the second port sealing element 42. The first port opening is sealed by first port sealing element 41' that is positioned in a SEAL position.

In FIG. 11 the movement of the first port sealing element 41' and of the second port sealing element 42' is a rotational movement about axis of rotation 48. It should be noted that the sealing of any one of the port openings may be done using any movement—rotational, linear, vertical, horizontal, and the like.

Figure 12:
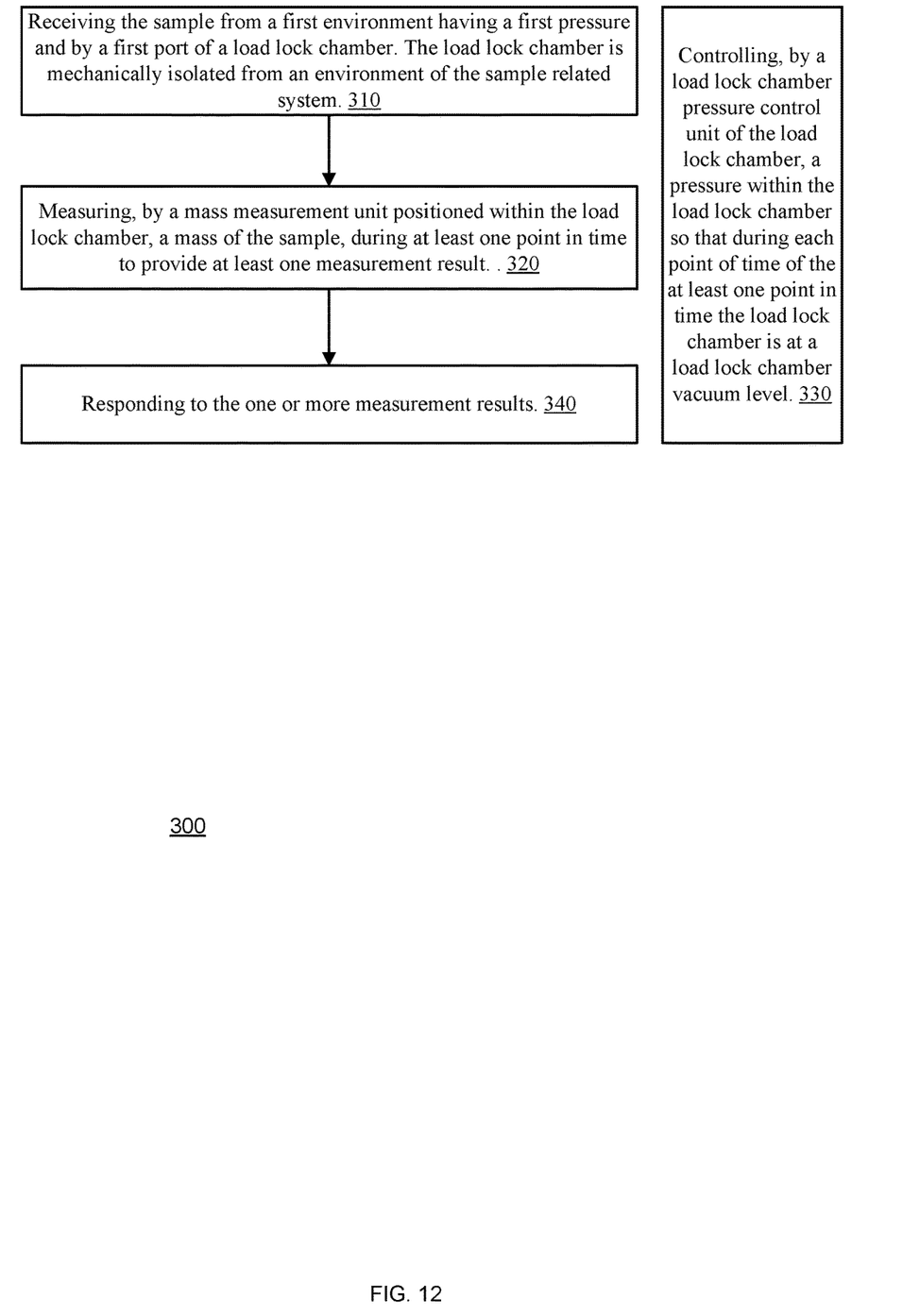
FIG. 12 is an example of a method.

FIG. 12 is an example of method 300 for mass measurement of a sample.

Method 300 may include step 310 of receiving the sample from a first environment having a first pressure and by a first port of a load lock chamber. The load lock chamber is mechanically isolated from an environment of the sample related system.

Step 310 may be followed by step 320 of measuring, by a mass measurement unit positioned within the load lock chamber, a mass of the sample, during at least one point in time to provide at least one measurement result.

Method 300 may also include step 330 of controlling, by a load lock chamber pressure control unit of the load lock chamber, a pressure within the load lock chamber so that during each point of time of the at least one point in time the load lock chamber is at a load lock chamber vacuum level. Steps 320 and 330 may at least partially overlap.

Step 320 may be followed by step 340 of responding to the one or more measurement results.

Step 320 may include measuring the mass of the sample during multiple points in time, wherein the sample is maintained within the load lock chamber between an earliest point of time of the multiple points in time and a latest point of time of the multiple points of time, and to provide multiple measurement results.

Step 340 may include at least one out of:
Determining a state of the sample based on the multiple measurement results. The state may be related to an outgassing from the sample.
Determine a timing of sending the sample through the second port to the vacuum chamber based on the state of the sample.
Delay the sending of the sample through the second port until an outgassing from the sample reaches below a predefined threshold.
Activating a heating element that is configured to expedite the outgassing.

Step 320 may include measuring the mass of the sample before an out-of-load-lock-chamber period of time and after the out-of-load-lock-chamber period of time to provide a plurality of measurement results. During the out-of-load-lock-chamber period that sample is located outside the load lock chamber. The plurality of measurement results are indicative of a state of the sample before the out-of-load-lock-chamber period and the state of the sample after the out-of-load-lock-chamber period.

Step 340 may include at least one out of:
Processing the plurality of measurement results and determining a relationship between the state of the sample before the out-of-load-lock-chamber period and the state of the sample after the out-of-load-lock-chamber period.
Determining, based on the relationship, a state of a sample processing operation applied on the sample during at least a part of the out-of-load-lock-chamber period.
Evaluating the sample processing operation based on the measurement results (of mass) and sample evaluation results (not mass measurements).
Providing the sample to an other load lock chamber that may include a mass measurement unit, may be without a mass measurement unit, may include additional elements or be without the additional elements.

The providing of the sample to the other load lock chamber or a providing of the sample to the load lock chamber may be preceded by (i) selecting a receiving load lock chamber out of the load lock chamber and the other load lock chamber, and (ii) transferring, by a transfer unit, the sample from the first environment to the receiving load lock chamber.

The determining of the receiving load lock chamber may be based on a state of the sample.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

What is claimed is:

1. A sample related system, comprising:
   a vacuum chamber;
   a load lock chamber that comprises:
   a first port that is interfaces with a first environment having a first pressure;
   a second port that interfaces with a second environment that comprises the vacuum chamber;
   a load lock chamber pressure control unit that is configured to control a pressure within the load lock chamber; and
   a mass measurement unit that is configured measure a mass of the sample, during at least one point in time, wherein during each point of time of the at least one point in time the load lock chamber is at a load lock chamber vacuum level;
   wherein the load lock chamber is mechanically isolated from an environment of the sample related system; and
   wherein the vacuumed chamber is for performing a sample related operations elected out of sample evaluation or sample processing.

2. The sample related system according to claim 1 wherein the mass measurement unit is configured to measure the mass of the sample during multiple points in time and to provide multiple measurement results, wherein the sample is maintained within the load lock chamber between an earliest point of time of the multiple points in time and a latest point of time of the multiple points of time.

3. The sample related system according to claim 2 comprising a processor configured to determine a state of the sample based on the multiple measurement results.

4. The sample related system according to claim 3 wherein the processor is configured to determine a timing of sending the sample through the second port to the vacuum chamber based on the state of the sample.

5. The sample related system according to claim 3 wherein the state of the sample is related to an outgassing from the sample.

6. The sample related system according to claim 5 wherein the processor is configured to delay a sending of the sample through the second port until an outgassing from the sample reaches below a predefined threshold.

7. The sample related system according to claim 5 further comprising a heating element that is configured to expedite the outgassing.

8. The sample related system according to claim 1 wherein the mass measurement unit is configured to measure the mass of the sample before an out-of-load-lock-chamber period of time and after the out-of-load-lock-chamber period of time to provide a plurality of measurement results; wherein during the out-of-load-lock-chamber period that sample is located outside the load lock chamber; wherein the plurality of measurement results are indicative of a state of the sample before the out-of-load-lock-chamber period and the state of the sample after the out-of-load-lock-chamber period.

9. The sample related system according to claim 8 further comprising a processor configured to process the plurality of measurement results and determine a relationship between the state of the sample before the out-of-load-lock-chamber period and the state of the sample after the out-of-load-lock-chamber period.

10. The sample related system according to claim 9 wherein the processor is further configured to determine, based on the relationship, a state of a sample processing operation applied on the sample during at least a part of the out-of-load-lock-chamber period.

11. The sample related system according to claim 10 wherein the processor is further configured to receive sample evaluation results.

12. The sample related system according to claim 1 further comprising an other load lock chamber that comprises:
   a third port that is configured to interface with the first environment;
   a fourth port that is configured to interface with the second environment; and
   an other load lock chamber pressure control unit that is configured to control a pressure within the other load lock chamber.

13. The sample related system according to claim 12 wherein the load lock chamber further comprises a sample alignment related unit and wherein the other load lock chamber is without the sample alignment related unit.

14. The sample related system according to claim 12 wherein the other load lock chamber further comprises a sample alignment related unit and wherein the load lock chamber is without the sample alignment related unit.

15. The sample related system according to claim 12 comprising a processor and a transfer unit; wherein the processor is configured select a receiving load lock chamber out of the load lock chamber and the other load lock chamber, and wherein the transfer unit is configured to transfer the sample from the first environment to the receiving load lock chamber.

16. The sample related system according to claim 15 wherein the processor is configured to determine the receiving load lock chamber based on a state of the sample.

17. A method for mass measurement of a sample, the method comprising:
- receiving the sample from a first environment having a first pressure and by a first port of a load lock chamber; wherein the load lock chamber is mechanically isolated from an environment of a sample related system;
- measuring, by a mass measurement unit positioned within the load lock chamber, a mass of the sample, during at least one point in time to provide at least one measurement result; and
- controlling, by a load lock chamber pressure control unit of the load lock chamber, a pressure within the load lock chamber so that during each point of time of the at least one point in time the load lock chamber is at a load lock chamber vacuum level.

* * * * *